Jan. 8, 1929.
W. L. BURNER
1,698,535
DUMP CAR BODY TILTING MECHANISM
Filed April 3, 1928 2 Sheets-Sheet 2
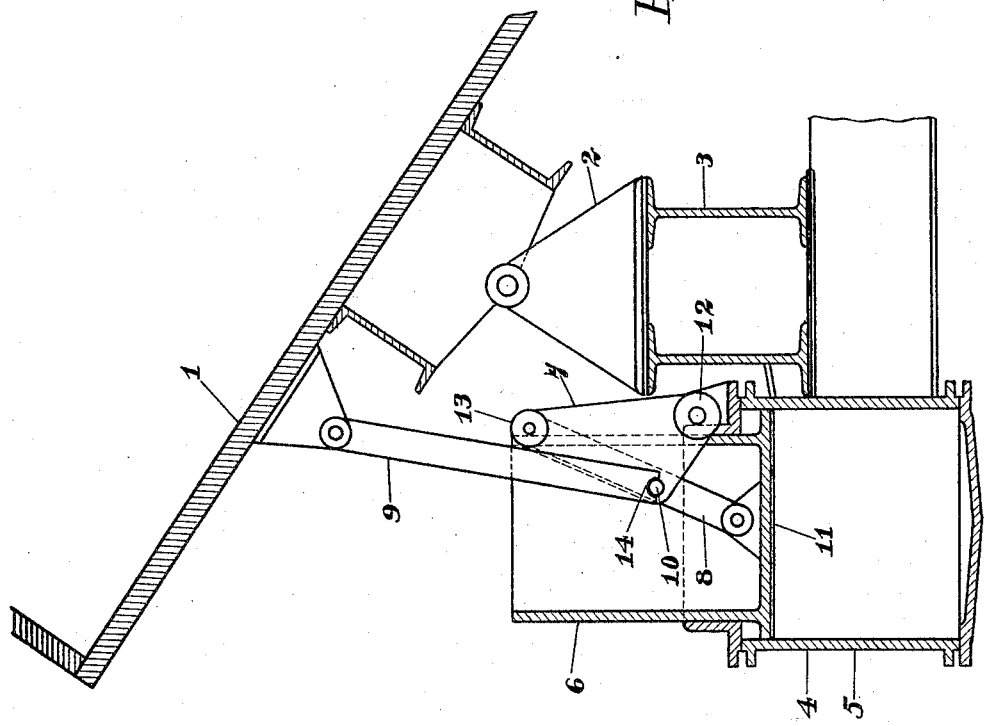
INVENTOR
William L. Burner,
by G. C. Lambie.
Atty.

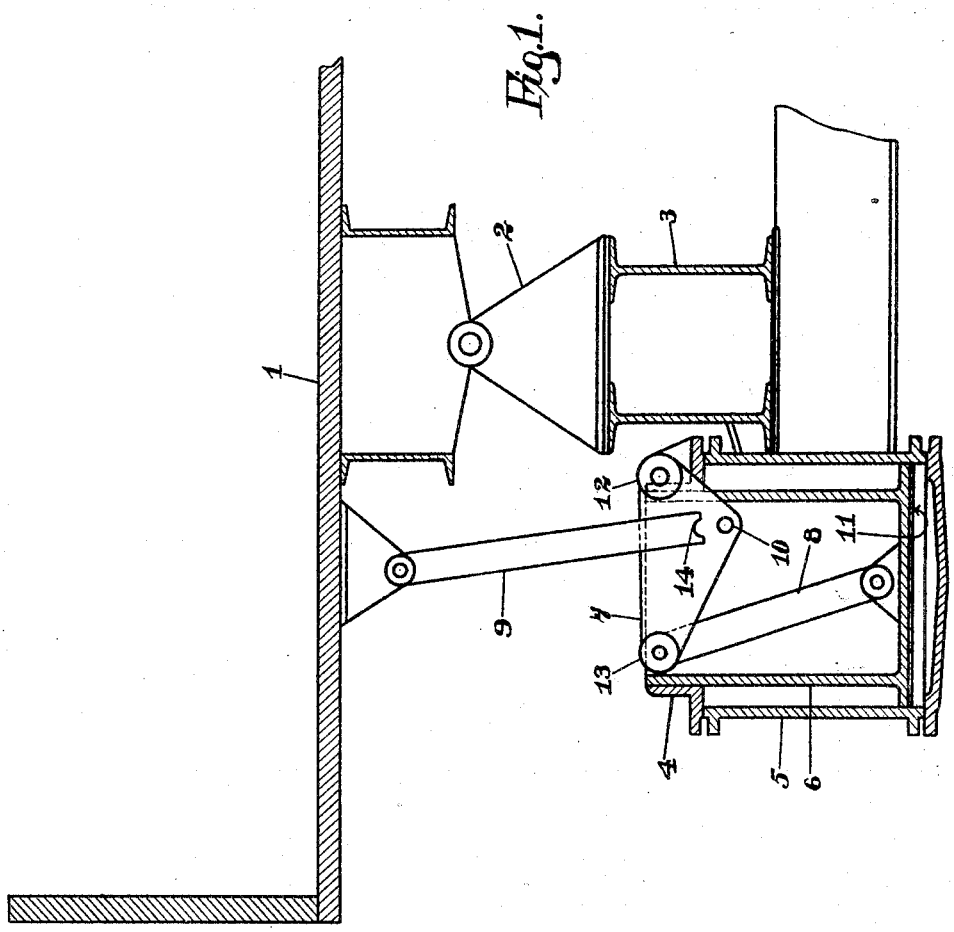

Patented Jan. 8, 1929.

1,698,535

UNITED STATES PATENT OFFICE.

WILLIAM L. BURNER, OF AURORA, ILLINOIS, ASSIGNOR TO KOPPEL INDUSTRIAL CAR & EQUIPMENT COMPANY, OF PITTSBURGH, PENNSYLVANIA, A CORPORATION OF PENNSYLVANIA.

DUMP-CAR-BODY-TILTING MECHANISM.

Application filed April 3, 1928. Serial No. 267,069.

An object of my invention is to provide a dump car with a pressure operated body tilting mechanism which will give a greater body tilting effort than was previously possible with the same size body tilting cylinders.

Another object of my invention is to provide a dump car with a pressure operated body tilting mechanism which permits the reduction of the effective length of the cylinder piston stroke with a corresponding increase of power in the body tilting effort.

Referring now to the drawings, Fig. 1 is an end view of the dump car, with the body in a horizontal position, and the body tilting mechanism; Fig. 2 is a view showing the body in tilted position and the corresponding position of the body tilting mechanism.

Referring now in detail to the drawings where like reference characters refer to like parts reference character 1 indicates a car body supported on a hinge 2 contained on the underframe 3. At the side of the underframe and supported thereon is a body tilting cylinder 4 comprising an outer casing member 5 and an inner piston member 6. In the present embodiment of the invention the member 6 is made hollow to permit the operation of the various members as will be hereinafter described. A lever member 7 is fulcrumed at one end near the side of the casing 5 and at the other end is connected by means of a member 8 to the piston 6 of the body tilting cylinder. This member 7 may have its fulcrum point either at the side of the cylinder or on the underframe depending on the construction of the car and the effort required to tilt the car body. In the present embodiment of the invention the lever is fulcrumed at the side of the cylinder, but it is to be understood that its position may be changed, as the detail construction of the car may require. The member 8 is connected to the lever member 7 and piston 6 so as to permit a partial rotating motion between these members and to allow the member 8 to assume the most advantageous position for transmitting the movement of the piston 6 to the member 7. Rockably connected to and depending downward from the body is the member 9 which is adapted to engage an outwardly projecting portion 10 of the member 7, during the operation of the cylinder 4, to cause the tilting of the car body. As shown by the drawings the member 9 is not in engagement with the portion 10 when the body is horizontal but is held in an operable position by any suitable means.

The pressure when admitted to the cylinder 4 bears against the face 11 of the piston 6 and forces it upward to the position shown in Fig. 2. The connecting member 8 between the piston 6 and lever 7 causes the lever 7 to rotate about its fulcrum 12 and to assume the position as shown in Fig. 2. During the rotation of the lever 7 the portion 10 of this member engages the portion 14 of the member 9 and carries the member 9 upward to cause the tilting of the car body.

From the above description and an inspection of the drawings it will be apparent that the member 7 acts as a transfer member during the tilting of the car body. This member 7 transfers the energy of the piston to the member 9 to cause the tilting of the car body.

Measuring from the fulcrum 12 the portions 10 and 13 describe arcs of action having different radii, the portion 13 being farther from the fulcrum point than the portion 10, this member 7 is therefore a lever of the second class, the point of application of work done being between the fulcrum point and the point of application of force. The member 9 engaging the portion 10 moves a shorter distance but with greater force than if it were attached directly to the piston 6. The member 9 is attached to the car body at a suitable point so that the shortened travel of this member is sufficient to tilt the body enough to completely discharge its contents. Thus it will be readily understood how a greater tilting effort may be obtained with the same size tilting cylinder and pressure equipment by the use of my invention or where a greater tilting effort is not required the tilting cylinder and pressure required can be reduced.

The car is described and shown in the drawings as though it were tiltable in one direction only. When it is desired to have the body tilt in both directions the mechanism is placed on both sides of the car and pressure is selectively admitted to the dumping cylinders to meet the dumping requirements. The mechanism at the side towards which the car is dumping remains idle during the dumping movement. The member 9 moves outward as the body begins to tilt and on further tilting of the body enters the hollow piston 6 to allow the complete dumping action to take place.

Although the mechanism has been described as tilting the body to one side or the other of the underframe, this mechanism can be used equally as well on an end dump body by placing the mechanism parallel to the length of the underframe instead of transversely.

Various changes in the details of construction will be apparent to those skilled in the art and which may be made without departing from the scope of the appended claims.

Having thus described my invention what I claim as new and desire to secure by Letters Patent is:

1. In a dump car, an underframe, a body tiltably mounted thereon, a pressure operated body tilting cylinder, a piston in said cylinder, a member fulcrumed at the side of said cylinder, means on said body and piston connecting to said member for operating said body.

2. The combintion in a dump car of an underframe, a dump body tiltably mounted thereon, a pressure operated cylinder at the side of said underframe, a member fulcrumed at one end to the side of said cylinder, and link members on said cylinder piston and body connected to said member for tilting said body.

3. In a dump car, a tilting body, a pressure operated body tilting cylinder, a lever of the second class connected at opposite ends to said cylinder piston and to said cylinder, and link means connecting said lever and car body.

4. In a dump car, an underframe, a dump body tiltably mounted thereon, a pressure operated body tilting cylinder, a piston in said cylinder, a member connected near one end to said piston and at the other end near the side of said cylinder, and a downward depending member from said body adapted to engage the aforesaid member intermediate its said points of connection.

5. In a dump car, an underframe, a dump body tiltably mounted thereon, a pressure operated body tilting cylinder, a piston in said cylinder, a member connected to said piston and to the underframe, a member connected to the car body and engaging the aforesaid member intermediate the piston and underframe connections.

6. In a dump car, an underframe, a dump body tiltably mounted thereon, pressure means for tilting said body, a downward depending member on said body adapted to engage said body tilting means, said means comprising a pressure operated cylinder, a piston in said cylinder and a member connected at one end to said piston and at the other end near the side of said cylinder, said member reducing the travel and correspondingly increasing the force transmitted through said downward depending body member.

7. In a dump car, an underframe, a body tiltably mounted thereon, a pressure operated body tilting cylinder on said underframe, a downward depending member on said body, a member connected at one end to the piston of said cylinder, said downward depending member engaging with said piston member to increase the force transmitted to the tilting car body.

8. In a dump car having a tiltable body, a body tilting cylinder, a downward depending member on said body, a lever connected at one end to said cylinder piston and the other end connected on said underframe, and adapted to be engaged by said downward depending member to cause the tilting of the car body.

9. In a dump car having a tiltable body, a pressure operated body tilting cylinder, a downward depending member on said body, a piston in said cylinder and means fulcrumed near the side of said cylinder and connected to said piston, said means intermediate its ends engaging said downward depending body member to cause the tilting of said body.

In testimony whereof I affix my signature.

WILLIAM L. BURNER.